Feb. 5, 1957 — O. E. SAARI — 2,780,146
GEAR SHAVING
Filed Jan. 18, 1954 — 6 Sheets-Sheet 1

INVENTOR
Oliver E. Saari
By: Olson & Trexler
attys.

Fig. 10.

United States Patent Office 2,780,146
Patented Feb. 5, 1957

2,780,146

GEAR SHAVING

Oliver E. Saari, Schiller Park, Ill., assignor to Illinois Tool Works, Chicago, Ill., a corporation of Illinois Application January 18, 1954, Serial No. 404,657

8 Claims. (Cl. 90—1.6)

This invention relates to a gear shaving tool and a machine for shaving gears by means of it.

Gear shaving is ordinarily practiced on a machine in which the gear to be shaved and the shaving tool are mounted on skew shafts, that is to say, on shafts which are not parallel and do not intersect. The usual shaving tool has the form of a helical gear mating with the gear to be shaved. Transverse gashes providing cutting edges are formed in the teeth of the helical gear or tool, and the teeth of the tool are forced into the spaces between the teeth of the gear. One of the shafts is power-driven and the other is floating. As a result, the cutter shaves roughnesses off the gear teeth but its cutting edges do not always generate the surfaces desired on the gear teeth and, therefore, do not correct inaccuracies in these teeth which may have resulted from the hobbing operation by which the gear was made.

Accurate surfaces on gear teeth could be generated by a cutter having the general form of a helical gear if the cutter were provided with cutting edges extending along the lines of travel of the points of contact between its teeth and the gear teeth. I have discovered that a cutter in the form of a helical gear may be provided with such cutting edges by cutting off one end of its teeth by an appropriate surface of revolution about the axis of the gear. A cutting tool made in this way is easy to produce, and the sharpening of this tool is easy, as it requires merely rotating the tool about its axis and grinding the surface of revolution at the end of the teeth so as to sharpen all the cutting edges simultaneously with a single grinder.

In the new cutting tool made in this way, cutting edges of the desired form appear only at one side of each tooth of the tool. These cutting edges are acute and are well adapted to scrape one side of each tooth of a gear meshing with the tool, and in so doing to generate an accurate surface on one side of the gear teeth when the cutting tool and the gear are turned in timed relation.

Largely because of its action upon only one side of the gear teeth, the acute edges of the new scraper or shaving tool tend to urge the gear to turn in the direction in which it is being rotated by its shaft in the shaving operation. Since the pressure of the shaving edges on the unfinished gear teeth is necessarily irregular, the shaving operation is not satisfactory unless carried out in a machine which prevents irregular forward movement of the gear under the influence of the scraper or tool.

In accordance with the invention, such movement of the gear is prevented by applying the driving power directly to the shaft on which the gear is mounted and indirectly to the cutter shaft through the timing gearing connecting the two shafts. This results in making the stress on the connecting gearing caused by engagement between the cutting edges of the tool and the teeth of the gear in the same direction as the stress on this gearing caused by the power drive, so that the gears of the gearing are constantly held in driving contact and prevent irregular forward movement of the gear.

Accordingly, a gear shaving machine embodying the invention, whereby an improved method of shaving may be practiced, comprises a cutting tool in the form of a helical gear in which one end of the threads are cut by a surface of revolution, skew shafts for the tool and the gear to be shaved, timing gearing connecting the two shafts, and means for applying driving power directly to the shaft on which the gear is mounted.

The principal object of the invention is to provide a simple gear shaving machine having an easily sharpened cutter which will smooth the surfaces of involute gear teeth and at the same time generate accurate involute surfaces on the teeth, correcting any errors in hobbing.

Other objects and advantages will become apparent from the following description and the accompanying drawings, wherein.

Figure 3:
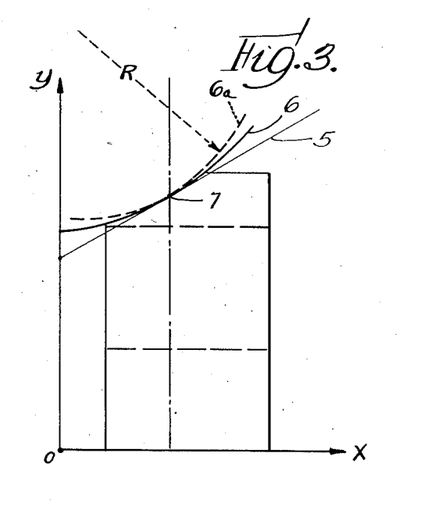
Fig. 3 represents the system of coordinates with expresses the formula for the hyperbola defining the surface of revolution containing the shaving edge of the tool.

It is well-known that when two involute gears operate on skew axes, one or both of the gears being of the spiral type with helicoidal teeth, the teeth of the two gears have a point contact; and, as the gears rotate, the contact point moves along a straight line called the path of contact which is fixed in space in a skew position relative to the axis of each gear. In spite of general knowledge of these facts, it appears not before to have been recognized that the line of travel of the point of contact on one of the gears may be determined by finding the intersection of the side surfaces of its teeth with the surface of revolution generated by the relative movement of the line of contact and the gear. Since the path of contact is in a skew position with respect to the gear axis, the surface of revolution which it will generate with respect to this gear is a hyperboloid of revolution. The formula for the hyperbola defining this surface can be expressed in the system of coordinates shown in Fig. 3. The $x$ axis is positioned along the axis of the gear and the $y$ axis is in the transverse plane containing the point at which the path of contact is tangent to the base cylinder of the gear. In these coordinates, the formula for the hyperbola is:

$$x = \tan a \sqrt{y^2 - r^2}$$

where $a$ is the base helix angle of the gear as defined in conventional involute gear geometry, and $r$ is the base radius of the gear.

Figure 1:
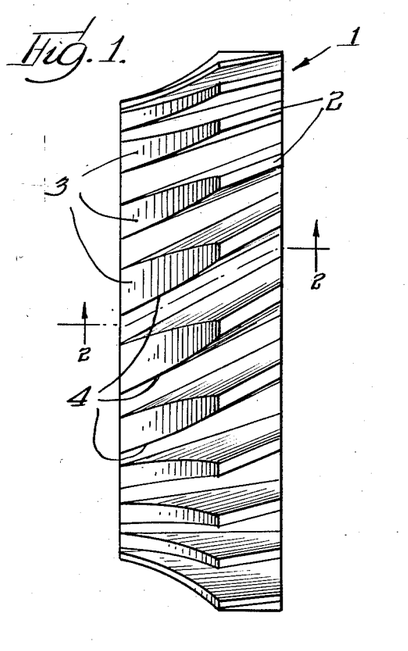
Fig. 1 is an elevational view of a novel shaving tool contemplated by the present invention.

Fig. 1 is a side elevational view of a shaving tool designated generally by the numeral 1, which comprises a plurality of helical involute teeth 2, the left extremities of which have been cut away so as to provide hyperbolic surfaces 3. By cutting away or relieving in this manner one extremity of each of the teeth 2, shaving edges 4 are presented. These shaving or cutting edges 4 will pass through every point of contact with the flanks of the teeth of a complementary gear member.

As previously pointed out, the line of travel of the point of contact may be determined by finding the intersection of the side surfaces of the teeth 2 with the surface of revolution 3 generated by the relative movement of the line of contact and a complementary gear. In Fig. 3 the straight line 5 is a projection of the path of contact. This path of the points of contact remains fixed as the shaving cutter rotates, and therefore sweeps out a surface of revolution which in the present instance is a hyperboloid of revolution as defined by the surface 3. The shaving or cutting edges 4 formed by the intersection of the hyperboloid with the involute helicoidal tooth form have the desired property of passing through every point of the path of contact because the hyperboloid is the locus of all positions the contact can have relative to complementary gear teeth. In Fig. 3 the hyperboloid is indicated by the line 6, and the pitch point, namely the point at which the line 5 is tangent to the line 6, is indicated by the numeral 7. It should also be understood that each hyperboloidal surface 3 is at right angles to the adjacent tooth flank at every point along the cutting edge 4. However, the cutting edge 4, when considered in a transverse section taken normal to the cutter axis, is acute and therefore facilitates the shaving or scraping action of the edge 4 upon the flank of a complementary gear tooth.

Figure 8:
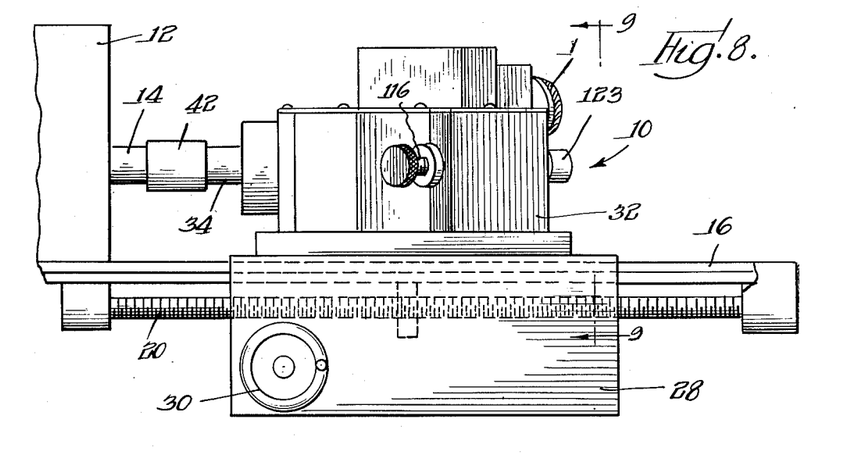
Fig. 8 is a side elevational view of gear tooth shaving apparatus embodying the principles and structural features of the present invention.
Figure 9:
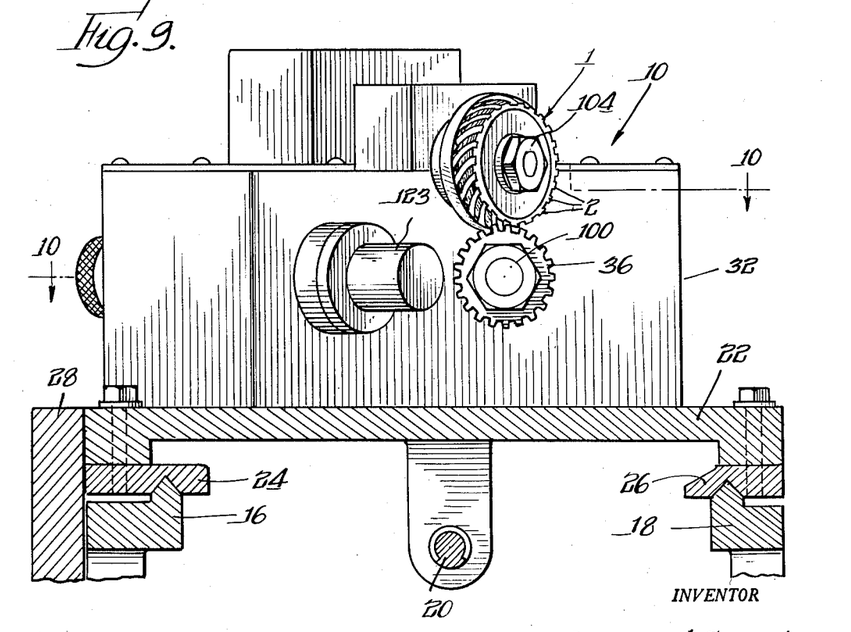
Fig. 9 is an end elevational view of the apparatus shown in Fig. 8 and taken along line 9—9 of Fig. 8.

In order for a clear understanding of the functioning of a shaving tool as contemplated by the present invention, it will now be described as a part of a shaving machine designated generally by the numeral 10, see Figs. 8, 9 and 10. The machine 10 forms an attachment or fixture which is adapted to be mounted on any standard lathe or the like having a variable speed power drive 12, a driving shaft 14, a pair of spaced guideways or tracks 16 and 18, and a feed screw 20.

The fixture 10 includes a base or carriage plate 22 having slides 24 and 26 bolted or otherwise secured thereto and slidably mounted upon the tracks 16 and 18. A plate member 28 depends from the carriage plate 22 for rotatably mounting a hand wheel 30, which wheel is interconnected by any conventional means, not shown, with the feed screw so that upon rotation of the wheel, the carriage is traversed along the tracks 16 and 18.

A housing 32 is rigidly mounted on the carriage plate 22 for supporting and enclosing work and cutter mounting arbors or mandrels and suitable gearing transmission therefor. As shown best in Fig. 10, a mandrel 34 for supporting a work piece, such as gear 36, is rotatably journaled in bearings 38 and 40 on the housing 32. The mandrel 34 is connected to the drive shaft 14, Fig. 8, by a suitable coupling 42. The bearings 38 and 40 support and maintain accuracy of alignment of the mandrel 34, and are slidable longitudinally of the mandrel 34 as an incident to the shifting of the housing 32 along the guideways 16—18. This shifting of the housing 32 enables the shaving tool 1 to be fed across the periphery of the rotating work or gear member 36 in a manner about to be described.

The shaving tool 1 is mounted on an arbor 46 which is disposed at a skew angle to the axis of the work piece supporting mandrel 34. The arbor 46 is journaled in the housing 32 by suitable bearings 48 and 50. The bearing 48 includes an annular thrust receiving portion 52 which is adapted to cooperate with a thrust bearing member 54 mounted on the arbor. The arbor 46 is driven by means of a gear chain or change gear transmission which includes a helical gear 56 rigidly secured to the inner end of the arbor. The gear 56 cooperates with a thrust receiving portion 58 of the bearing 50, to secure the arbor 46 and associated parts against longitudinal displacement relative to the housing 32.

Figure 11:
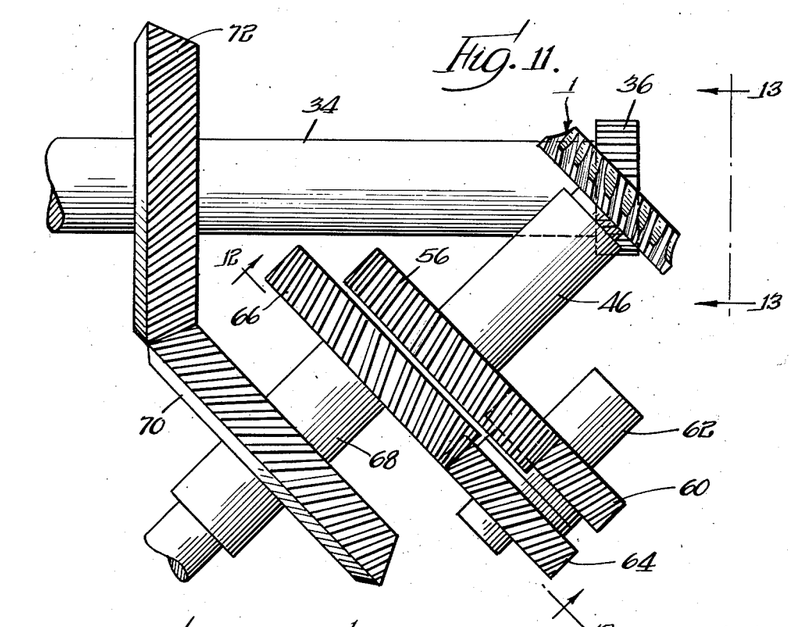
Fig. 11 is a simplified plan view of the transmission gearing of the above mentioned apparatus.
Figures 12, 13:
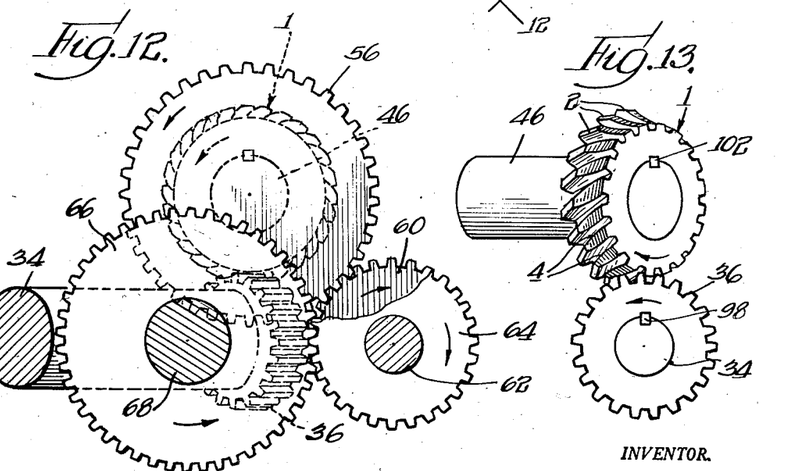
Fig. 12 is a cross-sectional view taken along line 12—12 of Fig. 11 illustrating the arrangement of the change gear transmission.
Fig. 13 is a fragmentary end elevational view taken along line 13—13 of Fig. 11.

As shown best in Figs. 11 and 12, the gear train for driving the shaving tool supporting arbor 46 also includes a helical pinion 60 keyed upon a shaft 62 and this pinion meshes with and drives the gear 56. The shaft 62 is driven by a helical gear 64 keyed thereto, which gear is in turn driven by a gear 66 keyed to a shaft 68. The shaft 68 has a bevel gear 70 fixed thereto, which meshes with and is driven by a complementary bevel gear 72 keyed to the work or gear driving mandrel 34. From the foregoing it will be apparent that the gear member 36 has a backlash free coupling with the drive mandrel 34 and that the rotary shaving tool is driven through a gear transmission from said mandrel.

Figure 10:
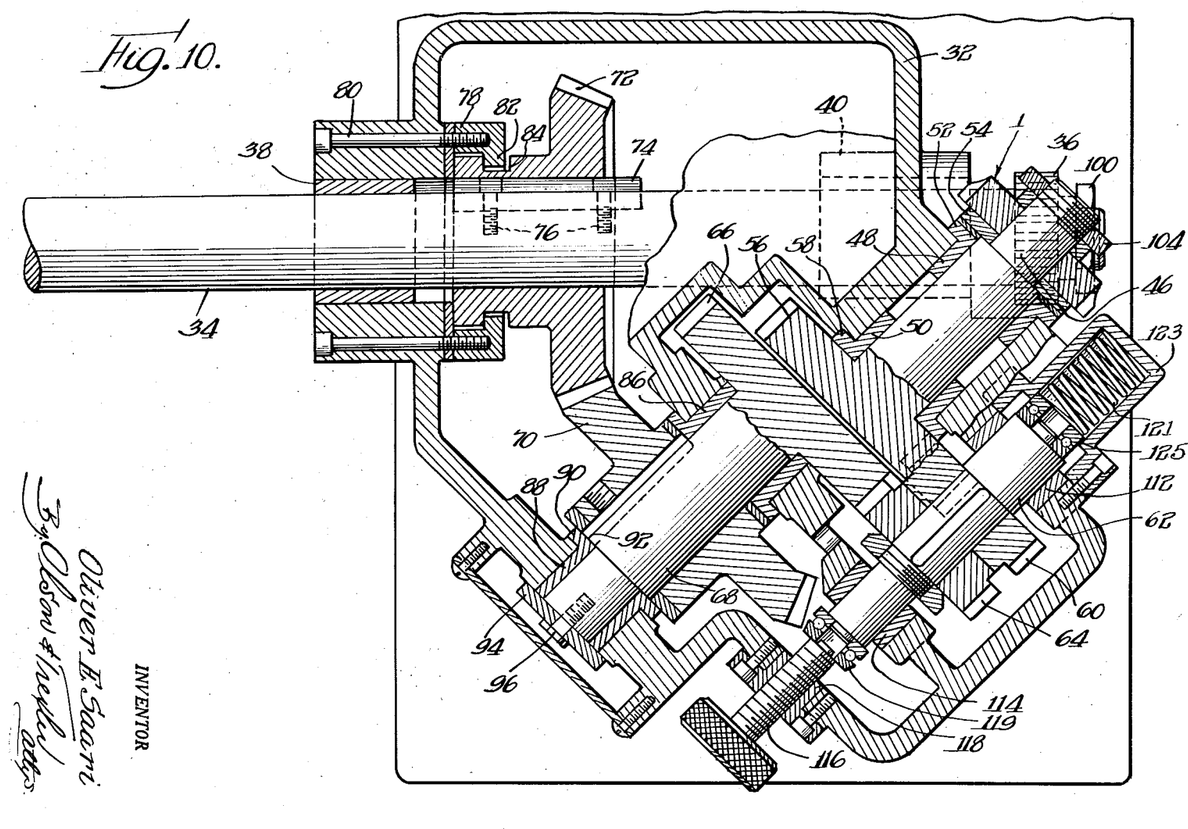
Fig. 10 is a horizontal cross-sectional view taken substantially along line 10—10 of Fig. 9.

Referring now to Fig. 10, it will be seen that the bevel gear 72 is mounted on the mandrel 34 for sliding movement longitudinally of the mandrel by means of a key 74 secured to the mandrel by screws 76. The key 74 thus provides a driving connection between the mandrel 34 and the gear 72 while permitting the gear to move longitudinally of the mandrel along with the housing 32 during a feeding movement of the shaving tool 1. The gear 72 is retained against longitudinal movement relative to the housing 32 by means of a bearing member 78 fixed to the housing by screws 80 and having an inwardly extending annular thrust bearing portion or flange 82 which projects into an annular groove 84 in the body of the gear.

The shaft 68 is journaled in suitable bearings 86 and 88 mounted in the housing 32. The bearing 88 has an annual thrust receiving portion 90 engageable with a shoulder 92 on the shaft 68 for preventing longitudinal movement of the shaft in one direction. The shaft is restrained against movement in the opposite direction by means of a thrust plate 94 secured thereto by means of a screw 96.

It should be noted that the gear 36 is rigidly retained against rotation relative to the mandrel 34 by a suitable locking key 98 and nut means 100 (see Figs. 10 and 13), and the shaving tool 1 is likewise rigidly secured to the arbor 46 by a suitable key 102 and nut means 104. The rotary tool 1 is synchronized with and driven at a predetermined speed ratio with respect to the speed of rotation of the work or gear member 36.

As previously set forth, each cutting edge 4 conforms generally to the path of point contact which the advancing side of each tooth element 2 will make with the finished gear 36. This arrangement of the shaving or cutting edges insures good cutting action, permitting relatively high speed, accurate shaving. In addition, this arrangement of the shaving edges enables the mandrel 34 and the arbor 46 to be disposed at a relatively large skew angle so that the sliding action between the tool and the work or gear member is increased. Preferably, the angle between the axes of the tool and the work is between 15° and 60° in order to obtain the desired shaving speeds.

As set forth above, the gear member 36 and the shaving tool 1 are both positively driven in synchronism with each other. It is common to prepare gear teeth for subsequent shaving or finishing by a roughing hobbing process. This consists in roughing out the teeth in the gear blank so that the teeth will be sufficiently oversize to permit subsequent finishing or shaving thereof. Inaccuracies or repetitive errors in the roughing hob such, for example, as errors in helical alignment of the hob teeth, may result in corresponding inaccuracies in the roughed out gear teeth. It is very important that such inaccuracies be eliminated in the completed gear. To accomplish this, the present invention contemplates the elimination of backlash in the gear and tool driving mechanism. By employing a backlash free coupling between the rotary gear support and the source of rotary power supply, such as the driving mandrel or shaft 34, and by coupling this drive shaft 34 with the shaving cutter 1 through the gear transmission as disclosed, the teeth 2 and shaving edges 4 of the tool coact with the complementary flanks of the teeth in the gear 36 so as to generate desired smooth and accurate gear teeth contours. In other words, the direct coupling of the gear with the source of rotary power, together with the cutting or shaving force of the edges 4 acting against the gear teeth as though these edges were driving the gear, completely eliminates backlash which might otherwise result. In shaving processes heretofore employed when a shaving cutter was driven against a freely rotatable gear member, errors resulting from backlash difficulties were experienced. By eliminating backlash as just described, errors in the gear teeth which may have been introduced during the previous forming or hobbing operation are corrected during the shaving operation.

To adjust the depth of the cut made by cutting edges 4 into the flanks of the gear teeth, it is merely necessary to rotate the tool 1 a slight amount relative to the gear member. Such rotative adjustment of the tool 1 is accomplished by the structure shown in Fig. 10. The shaft 62 carrying the helical gears 60 and 64 is not only rotatably supported by bearings 112 and 114, but is also axially adjustable in said bearings. An adjusting screw 116 is threaded into a suitable nut-like member 118 mounted on the housing 32, and the inner extremity of the shaft 62 bears against a ball-type thrust bearing 119. The shaft 62 is continuously biased against the adjusting screw 116 by a compression spring 121 disposed within a cup-shaped closure member 123 secured to the housing. Preferably, the spring 121 acts upon the shaft 62 through a ball-type thrust bearing 125. It will be apparent that upon rotation of the adjusting screw 116, the shaft 62 may be adjusted axially in opposite directions. Upon such axial adjustment of the shaft 62, the helical gears 56, 60, 64 and 66 will experience slight rotation. Variation in the degree of rotation imparted to the tool in response to a given axial adjustment of the shaft 62 may be obtained by employing change gears of different helix angles. In the disclosed embodiment the helix angle of the gear 56 is about 15° while the helix angle of the gear 66 is about 25°. By properly coordinating the helix angles of the gears 56 and 66 and the lead of the screw threads on the adjusting screw 116, accurate, fine adjustments of the depth of the cut may be obtained.

The method of finishing gears with the above described apparatus is as follows. The work or gear member 36 and the cutting tool 1 are secured to their respective mandrels, and the cutting tool 1 is adjusted by means of the thumb screw 116 to provide the desired depth of cut. The power source 12 is then energized so that the cutting tool and the work piece are driven in the manner described above. The housing 32 carrying the shaving tool is then fed axially of the mandrel 34 by means of the hand wheel 30. As the tool 1 moves across the work piece, one flank of each of the work piece teeth is accurately finished regardless of any inaccuracies which may have been present in the initial rough forming operation. The particular shape of the shaving edges 4 of the tool 1 and the relatively large angular relationship between the axes of the tool and the gear member enable improved, high speed shaving action so that the tool may be fed relatively rapidly across the work periphery without danger of producing undesirable scallops in the flanks on one side of the gear teeth. In order to finish the opposite flanks on the opposite side of the gear teeth, the gear member is removed and then remounted on the mandrel in reverse position, whereupon the above described operation is repeated. Thus shaving of one side of the teeth is performed independently of the shaving of the opposite side.

Figures 14, 15, 16, 17:
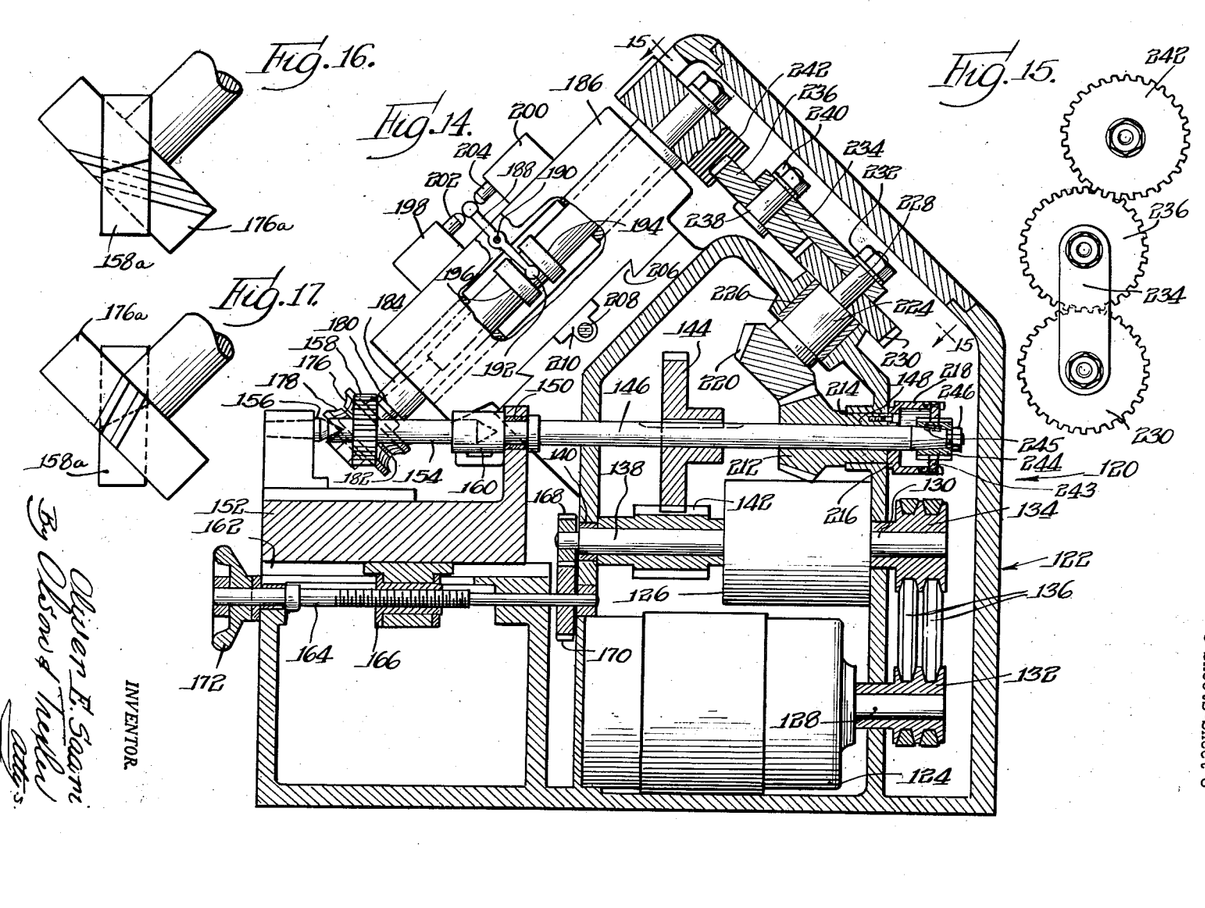
Fig. 14 is an elevational view partially in cross-section illustrating an apparatus embodying a modified form of this invention.
Fig. 15 is a fragmentary view taken along line 15—15 of Fig. 14 to illustrate more clearly the change gear transmission.
Figs. 16 and 17 are schematic views illustrating the manner in which the invention provides for the selective positioning of the shaving tool on either side of the work or gear.

In Figs. 14 and 15, a machine designated generally by the numeral 120 is illustrated which embodies the basic principles of the present invention and which is adjustable to accommodate work pieces or gear members of various sizes, and enables both sides or flanks of the gear member to be shaved without removing and reversing the position thereof with respect to its supporting mandrel. The machine 120 includes a housing 122 in which is mounted a motor 124 and a variable speed drive 126 for driving the work piece and the shaving tool. The motor drive shaft 128 is connected with an input shaft 130 of the variable speed drive by means of pulleys 132 and 134 and double V-belts 136. An output shaft 138 of the variable speed drive is journaled in the housing, as at 140, and carries a driving pinion 142 which meshes with a gear 144 keyed to a main drive shaft 146. The shaft 146 functions similarly to the above described mandrel 34 of the machine 10 and has one end slidably journaled in the housing 122 by a bearing 148. The opposite end of the shaft 146 is journaled, as at 150, in an upstanding portion of a carriage 152.

An arbor 154 is supported between the shaft 146 and a tailstock 156 of the carriage for supporting a work piece, such as a gear member 158. Any suitable means, such as the coupling sleeve 160 may be employed for obtaining a positive, backlash free, drive connection between the shaft 146 and the work supporting arbor 154. The carriage 152 is slidable on the frame or base 122 along guideways 162. A feed screw 164 is rotatably mounted on the base or frame 122 and cooperates with nut means 166 secured to the underside of the carriage for imparting feeding movement to the carriage with consequent axial translation of the gear member 158. Preferably, the feed screw is driven from the variable speed means 126, through gears 168 and 170 mounted on the drive shaft 138 and feed screw 164, respectively. In order to provide for initial adjustment of the carriage before the motor has been energized, a hand wheel 172 secured to the outer end of the feed screw 164 may be manipulated.

Figure 6:
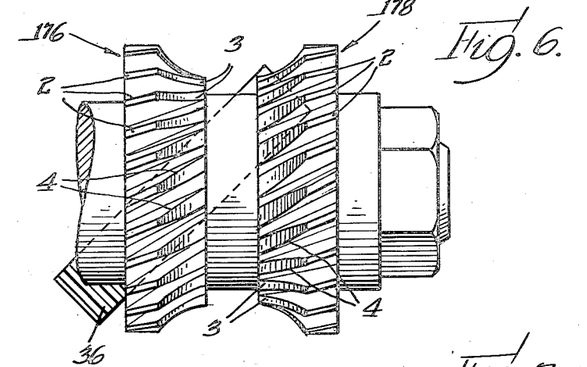
Fig. 6 is an elevational view disclosing a rotary shaving tool structure comprising a pair of cutter members mounted upon the same cutter supporting arbor.

The shaving machine 120 includes a shaving tool comprising two shaving members 176 and 178 keyed to an arbor 180 and spaced from each other by a member 182. These shaving members are identical in construction to the previously described cutter 1, and are shown in detail in Fig. 6. Upon rotation of the arbor 180 in one direction, the shaving edges of the member 176 finish the flanks on one side of the teeth of the gear member 158, and upon rotation of the arbor in the opposite direction the shaving edges of the member 178 finish or shave the flanks on the opposite side of the gear teeth. Since the shaving members 176 and 178 are axially spaced from each other, each of them does not interfere with or engage the work when the other is being used. Therefore, in order to position these members alternately for engagement with the work, it is necessary to shift the arbor 180 axially. The details of the shaving members 176 and 178 will be hereinafter more fully described.

The arbor 180 is rigidly mounted in a hollow drive shaft 184 which is rotatably journaled in a carriage 186. The shaft 184 is normally secured against longitudinal displacement by means of a lever or rocker arm 188 pivotally mounted on the carriage, as at 190, having an extremity 192 positioned between annular abutment members 194 and 196 fixed on the shaft. Pivotal movement of the lever 188 moves the shaft 184 axially, thereby selectively positioning either the shaving elements 176 and 178 with respect to the gear member 158. In order to operate the lever 188, pneumatic cylinders 198 and 200 are mounted on opposite sides thereof with the extremities of pistons 202 and 204 engaging opposite sides of the lever. Upon operation of the pneumatic cylinders 198 and 200 by any suitable control means, not shown, the lever 188 may be shifted automatically to position the shaving members 176 and 178.

In order to adjust the distance between the axes of the work mounting mandrel 154 and the cutter mounting arbor 180 so as to accommodate work pieces or gear members of various diameters, the carriage 186 is slidably mounted on a dovetail guideway 206. The position of the carriage 186 may be adjusted by any suitable means, such as a conventional screw 208, cooperating with a nut member 210 on the carriage.

In Fig. 14 the shaving members 176—178 are positioned behind the work piece. It should be understood that the shaving member may also be positioned in front of the work, as shown schematically in Fig. 17. As a matter of fact, the selection of either position is provided for by adjusting the carriage 186 upon the dovetail guideway 206. Such selective positioning of the shaving members on either side of the work allows for a choice of helix angles in the shaving members most suitable for a gear member with helical teeth. This is best illustrated in Figs. 16 and 17, both of which show a lefthand helical gear 158a of identical helix angle, and also illustrate a comparison of the direction and the magnitude of the helix angle of the shaving teeth, when the cutter 176a is mounted in front of the gear as in Fig. 17 and behind the gear as in Fig. 16. Thus, for each gear member there is a selection of one of two helix angles for the shaving member which affords the best cutting or shaving action.

As in the machine 10 described above, the shaving tool mounting arbor 180 of machine 120 is driven by a transmission gear including a bevel gear 212 through which the shaft 146 is longitudinally slidable. In the illustrated embodiment, the gear 212 and the bearing 148 are integral. The bevel gear 212 is restrained against axial movement in one direction by means of a shoulder 214, which bears against an annular abutment on the housing, and is restrained against axial movement in the opposite direction by means of a shoulder 216 on a hollow collar 218 secured to the bearing 148 by means of screws, Fig. 14. A cam follower member 243 is detachably secured to the collar 218, and is designed to coact within cam slots in the periphery of an axially movable cam 244, secured to shaft 146 by a key 245 and nut 246. The bevel gear 212 drives a bevel gear 220 provided with a shank 224 journaled in a bearing 226 in the housing 122. The shank 226 has a reduced diameter portion 228 keyed to a gear 230 which is retained by a nut 232 and link 234. An idler gear 236 driven by the gear 230 is rotatably mounted on the opposite end of the link 234 by means of a stub shaft 238 having an enlarged head at one end and a nut 240 at its opposite end. The idler gear 236 drives a gear 242 keyed to the tool supporting shaft 184. As shown in Fig. 15, the link 234 permits the idler gear 236 to be shifted laterally upon transverse adjustment of the cutter carriage 186 along the dovetail guideway 206. Suitable means, not shown, may be provided for acting upon the link 234 to maintain the gear 236 in driving engagement with the gear 242.

Referring again to the cam 244 driven by the shaft 146, it will be apparent that if the peripheral slots or grooves in the cam are parallel to the cam axis, the cam merely serves as driving means between the shaft 146 and the bevel gear 212. However, if the cam slots are not parallel to the cam axis but extend helically along the cam periphery, longitudinal movement experienced by the cam as a result of the transverse movement of the work supporting carriage 152 (Fig. 14) will cause a superimposed rotation to be imparted to the shaving tool. If the cam slots extend helically in one direction there will be a tendency for the shaving tool to rotate at a slightly increased rate, and if said slots extend helically in an opposite direction the shaving tool will experience a slight retardation in cutting speed. By properly shaping these cam slots, the teeth of the gear member may be given a slightly crowned effect. This is desirable for certain applications. Also, the cam 244 may serve the function of slightly varying the helix angle in the teeth of the work piece or gear member.

The operation of the machine 120, just described, is essentially the same as the previously described machine 10. In the machine 120 the work is shifted axially, whereas in the machine 10 the shaving tool is moved across the periphery of the work piece. Also, the machine 120 permits automatic translation of the carriage 152, as well as manual operation, whereas in machine 10 shifting of the carriage 22 is controlled manually. Also, as previously pointed out, the machine 120 is designed to accommodate a pair of rotary shaving members, and avoids the necessity of reversing the position of the work piece to complete the shaving of both flanks of the gear teeth. In machine 120 after one of the shaving members has finished the flanks on one side of the gear teeth, the shaft 184 is shifted axially to bring the other shaving element into engagement with the work piece and the motor 126 is actuated in reverse direction.

Figure 2:
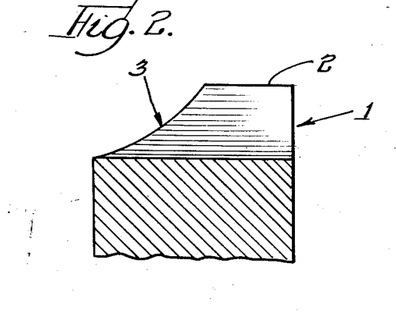
Fig. 2 is a fragmentary sectional view of the shaving tool taken substantially along the line 2—2 of Fig. 1.
Figure 4:
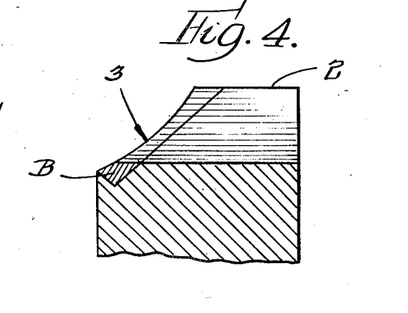
Fig. 4 is a fragmentary sectional view similar to Fig. 2 illustrating the manner in which the shaving tool of this invention may include hardened inserts, such as carbide tips.

This invention lends itself for the use of carbide inserts such as the insert B, shown in Fig. 4. Fig. 4 is a view similar to Fig. 2 and illustrates the manner in which the hardened insert may be employed to insure long tool life. In shaving tools heretofore available, this feature of construction was not possible. In applicant's shaving tool the cutting edge extends from the top of each tooth to the base, as indicated by the surface 3 in Figs. 1, 2 and 4, thus enabling easy access thereto of a form grinder or the like. The remaining portion of each tooth constitutes a gear tooth substantially conjugate with the complementary teeth in the gear member to be shaved.

Figure 7:
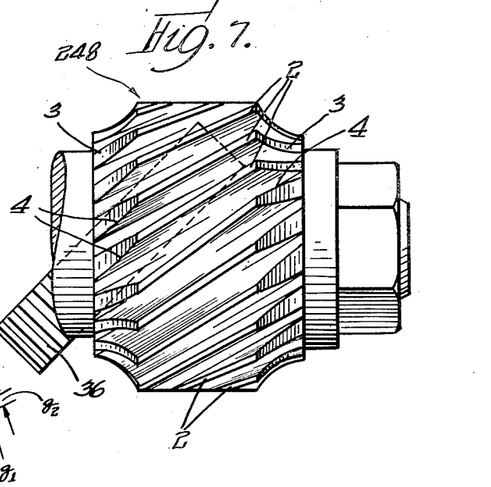
Fig. 7 is a view similar to Fig. 6 illustrating a modified form of rotary shaving tool comprising a single tool member having shaving edges at opposite extremities of the teeth.

Fig. 7 discloses a single or solid rotary shaving tool with shaving teeth provided at each end thereof. This tool is designated generally by the numeral 248. The tool 248, like the tools 1—176—178 previously described, comprises a plurality of helical gear teeth 2 which are relieved at their opposite extremities to provide shaving or cutting edges 4. When rotated in one direction the edges 4 at one extremity of the teeth 2 may be employed to shave flanks on one side of the gear teeth. By shifting either the shaving tool or the gear member axially, the shaving teeth 2 at the opposite end of the tool may be positioned for acting upon the opposite flanks of the gear teeth. Obviously, in making the second shaving cut the tool must be rotated in reverse direction.

Figure 5:
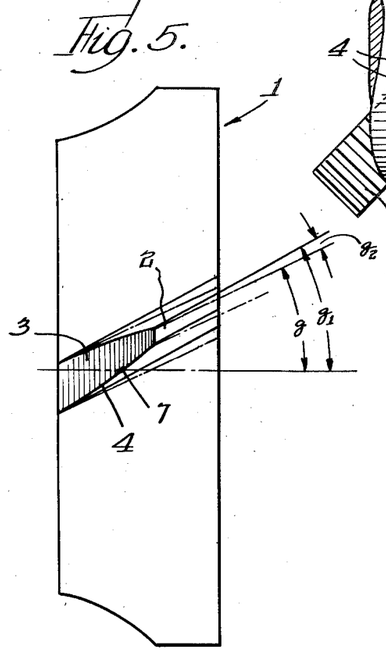
Fig. 5 diagrammatically illustrates the manner in which the cutter teeth may be provided with side clearance.

Positive side clearance for the shaving or cutting teeth 2 may be provided by forming these teeth with a helix angle which differs from the theoretical cutter, the difference in such helix angles being equal to the positive amount of side clearance desired. This is illustrated in Fig. 5 wherein the cutter 1 is shown in outline and one of the helical teeth 2 is shown in elevation. If the helix angle of the theoretical cutter is $g$, the side clearance angle is $g_2$ and the helix angle of the modified cutter is $g_1$. This may be expressed in the following formula:

$$g_1 = g_2 + g_3$$

This slight deviation in helix angle renders the cutting edge 4 more aggressive while the sharpening surface 3 remains substantially the same in shape, either a hyperboloidal surface or one of its close approximations.

The present invention facilitates the ease with which gear teeth may be shaved with an intentional crowned profile and helix. In prior gear shaving processes, crowning of the gear tooth profile is obtained by modifying the profile of the cutter. In the present shaving process crowning of both profile and longitudinal shape may be accomplished very easily by imparting a different shape to the surfaces 3. An exaggerated change in the shape of the surfaces 3 is indicated by the dotted circle 6ª in Fig. 3. Instead of employing the hyperbolic shape 6, a circular shape 6ª struck from a radius $r$ may be employed. This causes the cut or shaving edges 4 to remove more material from the inner and outer portions of the flank surfaces on the gear, thereby imparting a crowned shape to the gear teeth. Likewise, by employing the side clearance indicated in Fig. 5 and varying the depth of cut from one extremity of the gear tooth to the other, the gear teeth may be crowned longitudinally. This method of producing combined transverse and longitudinal crowning of the gear teeth represents a distinct advantage over conventional shaving cutters where the crowning must be built into the involute profile at considerable increase in cost. The modification of the curvature of the surfaces 3 may be accomplished by a very simple grinding operation.

It will be apparent from the foregoing description that the present invention contemplates simple and improved means whereby flanks of teeth such as gear teeth, involute splines and the like, may be finished or shaved with great accuracy and with increased speed. By driving shaving edges of a rotating shaving tool against the flanks on one side of the teeth of the rotatably supported gear member, and rotatably driving the gear member in timed relation with the movement of the shaving edges and relatively shifting these edges and the gear teeth axially, predetermined smooth and accurate flank contours are generated. The flanks on the opposite sides of said gear teeth may be similarly generated by reversing the position of the work or tool on its respective support and applying the same shaving edges or by applying a series of other shaving edges without the necessity of reversing the position of the work or tool. Elimination of backlash difficulties represents another important contribution of the present invention. The invention also lends itself for shaving gear members of varying sizes and shapes and insures economy in the cost of shaving tool design and maintenance.

Certain specific disclosures, both structural and schematic, have been disclosed herein for the purpose of indicating practical embodiments of the invention, and it will be understood that other modifications and changes may be made without departing from the spirit and scope of the appended claims.

The invention is hereby claimed as follows:

1. A gear-shaving tool comprising a helical gear having one end of its teeth cut off by a toroidal surface coaxial with the gear to provide a cutting edge at the intersection of said surface with one side of each tooth, the cutting edge of each tooth of the tool approximating a line which is the locus of the successive points of contact of the flank of said tooth with the flanks of complementary teeth of a gear to be acted upon.

2. A gear-shaving tool comprising a helical gear having one end of its teeth cut off by a hyperboloid of revolution which provides at its intersection with one side of each tooth a cutting edge lying on the line of travel of the point of contact of this side with the tooth of a mating gear.

3. A rotary gear shaving tool including a body, elements in the nature of gear teeth spaced along the periphery of said body, flank contours along at least one side of said teeth adapted for engaging a complementary gear to be acted upon by the tool, a portion of one extremity of said teeth being relieved longitudinally and transversely to present hyperbolic surfaces of revolution completely traversing the teeth and generally inclined outwardly with respect to the tool axis from the base to the crest of each tooth, said surfaces intersecting adjacent tooth flanks to provide a plurality of circularly aligned cutting edges, the cutting edge of each tooth of the tool approximating a line which is the locus of the successive points of contact of the flank of said tooth with the flanks of complementary teeth of a gear to be acted upon.

4. A gear-shaving machine comprising a shaving tool in the form of a helical gear having one end of its teeth cut off by a surface of revolution, skew shafts on which the tool and the gear to be scraped are fixed, gearing connecting the two shafts to control their relative rate of rotation, and means for applying driving power directly to the shaft on which the gear is fixed so that the tool shaft is driven through the connecting gearing.

5. A gear-shaving tool comprising a helical gear in which each tooth is cut off at one end by a curved surface extending completely across the tooth and intersecting one side of the tooth in a cutting edge approximating the line of intersection of this side of the tooth with a hyperboloid of revolution.

6. A gear-shaving machine comprising a shaving tool in the form of a helical gear having at one side only of each of its teeth an inclined scraping edge, skew shafts on which the tool and the gear to be scraped are fixed, gearing connecting the two shafts to control their relative rate of rotation, and means for applying driving power directly to the shaft on which the gear is fixed so that the tool shaft is driven through the connecting gearing.

7. A gear-shaving tool comprising a helical gear having one end of its teeth cut off by a toroidal surface which is tangent to the hyperboloid of revolution whose intersection with one side of each tooth defines the line of travel of the point of contact of this side of the tooth with the tooth of a mating gear, said toroidal surface approximating the shape of said hyperbolic surface.

8. A gear-shaving tool comprising a helical gear in which each tooth is cut off at one end by a surface extending completely across the tooth and intersecting one side of the tooth in a cutting edge approximating the line of this side of the tooth which is the locus of the successive points of contact of this flank of said tooth with the flanks of complementary teeth of a gear to be acted upon.

References Cited in the file of this patent

UNITED STATES PATENTS

| Number | Name | Date |
|---|---|---|
| 1,131,198 | Benson | Mar. 9, 1915 |
| 1,168,402 | Lees | Jan. 18, 1916 |
| 1,175,066 | Lees | Mar. 14, 1916 |
| 1,996,987 | Wildhaber | Apr. 9, 1935 |
| 2,098,428 | Miller | Nov. 9, 1937 |
| 2,126,178 | Drummond | Aug. 9, 1938 |
| 2,280,045 | Miller | Apr. 14, 1942 |
| 2,305,145 | Dalzen | Dec. 15, 1942 |
| 2,335,215 | Schurr | Nov. 23, 1943 |
| 2,350,974 | Grayson | June 6, 1944 |
| 2,356,868 | Miller | Aug. 29, 1944 |
| 2,585,261 | Mentley | Feb. 12, 1952 |
| 2,612,080 | Davis | Sept. 30, 1952 |
| 2,660,929 | Praeg | Dec. 1, 1953 |

FOREIGN PATENTS

| Number | Country | Date |
|---|---|---|
| 668,067 | Germany | Nov. 25, 1938 |